United States Patent [19]

Becker et al.

[11] Patent Number: 4,502,962

[45] Date of Patent: Mar. 5, 1985

[54] HYDROCARBON SOLVENT-BASED DISPERSANT FORMULATION AND ITS USE IN THE DISPERSION OF VISCOUS OIL SPILLS

[75] Inventors: Kenneth W. Becker; James R. Jackson; Gordon P. Lindblom; Marjorie A. Walsh, all of Houston, Tex.

[73] Assignee: Exxon Research & Engineering Co., Florham Park, N.J.

[21] Appl. No.: 416,952

[22] Filed: Sep. 13, 1982

[51] Int. Cl.$^3$ .............................................. E02B 15/04
[52] U.S. Cl. .................................. 210/749; 210/925; 252/312; 252/354
[58] Field of Search .............. 210/923, 749, 925, 693, 210/610; 252/354, 356, 312

[56] References Cited

U.S. PATENT DOCUMENTS

| | | | |
|---|---|---|---|
| 3,793,218 | 2/1974 | Canevari | 210/749 |
| 3,959,134 | 5/1976 | Canevari | 210/749 |
| 4,250,050 | 2/1981 | Asbeck et al. | 252/354 |
| 4,469,603 | 9/1984 | Lepain et al. | 210/749 |

OTHER PUBLICATIONS

*The Condensed Chemical Dictionary*, 8th Edition, p. 445, Hawley, Gessner, New York.
McCutcheon's, *Detergents and Emulsifiers*, North American Edition, 1973, McCutcheon's Division, Allured Publishing Co., Ridgewood, N.J., p. 112.

*Primary Examiner*—Peter Hruskoci
*Attorney, Agent, or Firm*—Roland A. Dexter

[57] ABSTRACT

A hydrocarbon solvent-based dispersant formulation which combines heavy oil penetrability, activity on oil spills on either fresh or salt water, and the density and viscosity required for controllable aerial spray application is provided by the combination of sorbitan monoesters of $C_{10}$–$C_{20}$ aliphatic carboxylic acids and polyoxyalkylene adducts thereof, polyoxyalkylene adducts of sorbitan triesters of $C_{10}$–$C_{20}$ aliphatic carboxylic acids, and a water-dispersible salt of a dialkyl sulfosuccinate dissolved in an isoparaffinic hydrocarbon. The addition of a viscosity modifying solvent may be advantageous for adjusting the formulation to needs of specific aerial application procedures.

7 Claims, No Drawings

HYDROCARBON SOLVENT-BASED DISPERSANT FORMULATION AND ITS USE IN THE DISPERSION OF VISCOUS OIL SPILLS

The present invention relates to an improved, biodegradable, dispersant formulation for use on viscous oil slicks. More particularly, the present invention is directed to improved, hydrocarbon solvent-based, dispersant formulations and methods for using said formulations, including aerial spray treatment of oil spills.

BACKGROUND OF THE INVENTION

The discharge of oil into water results in the formation of oil slicks, i.e. continuous films on said water of sub-millimeter thickness. Such oil slicks or films are undesirable not only from an aesthetic standpoint but also because cohesive oil slicks represent a serious hazard to marine life as well as a potential shore line contaminant.

Large area cohesive oil slicks are oftentimes the result of accidents in off-shore drilling operations of from tanker collisions. Various chemical techniques have been devised for responding to these accidents including the use of chemicals for dispersing the oil into the water such as is disclosed in U.S. Pat. No. 3,793,218 and as oil collection agents such as are disclosed in U.S. Pat. No. 3,959,134.

When these large area oil slicks are of viscous oil or oil whose viscosity was increased because of exposure to "weathering," only the presently known hydrocarbon solvent-based chemical dispersant formulations are generally useful as is well known in the art.

A hydrocarbon solvent-based chemical dispersant formulation is required which is more effective and efficient in promoting dispersion of heavy oil slicks than presently known formulations. Of additional importance for a versatile dispersant formulation for use on spills covering a wide area is that it must be capable of being applied efficiently by aerial spray from large aircraft with minimal drift off-target. Also, a more effective product is required for spills on fresh or low-salinity waters.

It is an object of the invention to provide a dispersant formulation which can both more effectively penetrate into and diffuse through heavy (highly viscous) oil slicks and be applied by means of an aerial spray.

SUMMARY OF THE INVENTION

In accordance with the present invention, it has been found that intact cohesive heavy oil films or slicks can be rapidly dispersed by contacting the same with a hydrocarbon solvent-based dispersant formulation comprising a sorbitan monoester of a $C_{10}$–$C_{20}$ aliphatic monocarboxylic acid, a polyoxyalkylene adduct of sorbitan monoester of a $C_{10}$–$C_{20}$ aliphatic monocarboxylic acid, a polyoxyalkylene adduct of a sorbitan of a $C_{10}$–$C_{20}$ aliphatic monocarboxylic acid triester and an anionic surfactant dissolved in an isoparaffinic hydrocarbon solvent. Further, it has been discovered that the aforesaid dispersant formulation of the invention has an unexpectedly high viscosity for hydrocarbon-based formulations when the isoparaffinic hydrocarbon solvent is a mixture of isoparaffins having a boiling range of from about 207° to 255° C. This high viscosity dispersant formulation is uniquely suitable for propagation by aerial application since its viscosity is or can be usefully modified by the addition of a viscosity reducing agent to a value appropriate for pumping, spraying, and effective deposition of the formulation.

Thus in accordance with this invention there is provided a dispersant composition and a means for its propagation which is a method for dispersing a slick of a hydrocarbon oil on water which comprises contacting said oil slick with a dispersant formulation comprising: a sorbitan monoester of a $C_{10}$–$C_{20}$ aliphatic monocarboxylic acid; a polyoxyalkylene adduct of a sorbitan monoester of a $C_{10}$–$C_{20}$ aliphatic monocarboxylic acid, said adduct having from 6 to 30 polyoxyalkylene units per mole of monoester; a polyoxyalkylene adduct of a sorbitan triester of a $C_{10}$–$C_{20}$ aliphatic monocarboxylic acid, said adduct having from 6 to 30 polyoxyalkylene units per mole of triester; an anionic surfactant having a critical micelle concentration (at 25° C.) of 0.0005 to 0.005 grams per 100 ml.; and from 15 to 40, preferably 20 to 35, weight percent of an isoparaffinic hydrocarbon solvent, said weight percent based on the total weight of said composition.

In preferred form the dispersant composition in accordance with this invention comprises from 15 to 40 weight percent of sorbitan trioleate ethoxylated with from 6 to 30 moles of ethylene oxide per mole of sorbitan trioleate, from 5 to 15 weight percent of sorbitan monooleate, from 5 to 15 weight percent of sorbitan monooleate ethoxylated with from 6 to 30 moles of ethylene oxide per mole of sorbitan monooleate, from 5 to 15 weight percent of sodium dialkyl sulfosuccinate, from 5 to 10 weight percent of ethylene glycol monobutyl ether, from 1 to 3 weight percent of hexylene glycol, from 1 to 3 weight percent water and from 20 to 30 weight percent of an isoparaffinic hydrocarbon solvent having a boiling range of from 115° C. to 255° C.

The dispersant composition can be applied to the oil slick either alone or in conjunction with an additional suitable solvent or diluent. Highly desirable results are achieved by spraying the dispersant system directly and as uniformly as possible onto the surface of the oil slick using approximately 1 part by volume of dispersant per 15 to 50 parts by volume of oil. It is ordinarily not necessary to mechanically agitate the treated oil slick in order to achieve effective dispersion since the normal wind and wave energy present at the sea surface will be adequate to cause breakup of the slick. The ability of the dispersion compositions of this invention to achieve effective dispersion as a result of aerial spraying and without application of mechanical agitation is a major advantage of the dispersants of this invention. These dispersants are unique hydrocarbon solvent-based products having a self-activating capability after propagation onto an oil slick.

DESCRIPTION OF THE PREFERRED EMBODIMENTS

Usable aliphatic carboxylic acids from which the sorbitan esters can be prepared are straight or branched chain saturated and unsaturated acids containing about 10 to about 20 carbon atoms. Preferred acids are straight chain saturated and monoethylenically unsaturated aliphatic monocarboxylic acids containing 12 to 18 carbon atoms. Representative acids include: capric acid, lauric acid, myristic acid, palmitic acid, margaric acid, stearic acid, nondecylic acid, oleic acid, elaidic acid, etc. These acids can be represented by the following general formula:

R—COOH where R is a $C_9-C_{19}$ straight chain, branched chain or cyclic monovalent alkyl or alkenyl radical, preferably a straight chain alkyl or alkenyl radical.

The sorbitan monoesters and triesters of alphatic carboxylic acids of the present invention are formed by the reaction of an aliphatic carboxylic long chain saturated or unsaturated fatty acid with a mixture of polyalcohols formed by the dehydration of sorbitol. The dehydration products of sorbitol to the 3 intermediate sorbitan compounds upon reaction with the $C_{10}-C_{20}$ long chain monocarboxylic acid yields a "sorbitan monoacylate" which actually denotes one of 3 compounds alone or in admixture which are herein represented by the general formula:

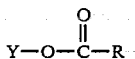

where R is as previously defined and Y is a monocyclic or bicyclic sorbitan radical (a sorbitan radical being defined as one of 3 isomers resulting from the dehydration with one of the hydrogen atoms of one of the hydroxyl groups being removed).

For a complete discussion of the foregoing reference should be made to U.S. Pat. No. 3,959,134 (cols. 4 and 5).

To produce the triester of sorbitan, 3 moles of the $C_{10}-C_{20}$ alkyl monocarboxylic acid is reacted with each mole of sorbitan and 3 moles of water are removed in a manner as discussed above wherein the monoester is produced. Both the fatty acid monoester and triester of sorbitol are articles of commerce.

The polyoxyalkylated derivative of the sorbitan monoester generally contains from 6 to 30, preferably 10 to 24, moles of alkylene oxide which provides useful levels of hydrophilicity to the sorbitan monoester molecule. The polyoxyalkylation includes ethoxylation and/or propoxylation by conventional techniques of an olefin oxide compound, e.g. ethylene oxide, propylene oxide and/or mixtures thereof and the sorbitan monoester. The reaction is exothermic with the temperature usefully held at from 40°–65° C., e.g. at about 60° C.

The polyoxyethylene adduct of several sorbitan monoesters including sorbitan monooleate are commercially available as polysorbates.

The weight ratio of the monoester of sorbitol to the polyoxyalkylene adduct of said monoester to the polyoxyalkylene adduct of the triester of sorbitol range from 1:0.5:0.5 to 1:2:30 with a ratio of 1:1:3 preferred.

The hydrocarbon solvents employed in the present invention can be broadly described as any mixture of isoparaffinic hydrocarbons of high purity with a boiling range of about 115° C. to 250° C. and aromatic content of less than 3%. While other hydrocarbon-nonpolar solvents such as toluene, xylene and aromatic naphtha may be similarly effective in the formulation and its aerial application, they are not used because of toxicity considerations. Useful hydrocarbon solvents are marketed by Exxon Company, U.S.A. as the Isopar series.

Similar generic types are sold as the following with the variation in boiling range noted:

| | | |
|---|---|---|
| Isopar E | Boiling Range | 115–143° C. |
| Isopar G | Boiling Range | 160–177° C. |
| Isopar H | Boiling Range | 177–191° C. |
| Isopar K | Boiling Range | 177–204° C. |
| Isopar L | Boiling Range | 189–208° C. |
| Isopar M | Boiling Range | 207–255° C. |

Optimally, for aerial applications the isoparaffin employed is Isopar M and is present in amounts of 20 to 30 weight percent based on the total composition which provides a dispersant formulation with the requisite range of high viscosities not available with other hydrocarbon solvents.

The anionic surfactant usually is a salt of a dialkyl sulfosuccinate wherein the alkyl group is a branched chain radical containing 10 to 15 carbon atoms and preferably has a critical micelle concentration (at 25° C.) of 0.0005 to 0.005 grams/100 ml, optimally about 0.001 grams/100 ml. The optimum anionic surfactant is sodium ditridecyl sulfosuccinate. This surfactant is commercially available under various trade names, such as "Monowet MT-70" sold by Mona Industries, Inc. of Paterson, N.J. Not all commercially available forms of this compound give precisely the same results in the dispersant formulations of the present invention, and the selection of a particular commercial surfactant and the proportioning of the same must be done so that the critical micelle concentration is in the range of about 0.0005 to 0.005 grams/100 ml. as previously defined.

The isoparaffinic solvent may be used, and should be used for more effective aerial applications, in combination with a viscosity reducing agent to adjust the viscosity to from 60 to 150 preferably about 100, centistokes, as measured at 60° F., thereby facilitating the pumping and spraying of the formulation. Such agents include kerosene, glycols, naphthenics and glycol ethers. The preferred agent is ethylene glycol monobutyl ether and is used in amounts of from 5 to 10 weight percent based on total formulation in order to realize the desired viscosity.

Heavy oil slick dispersion can be achieved by spraying the dispersant formulation of the invention onto the surface of the oil slick. It is desirable that the oil dispersant formulation be applied at the requisite dosages through spray nozzles positioned on a boat or aircraft to supply a uniform spray for even distribution. Application levels range from one volume part of dispersant formulation per 10 to 50 volume parts of oil which approximates doses of about 3 to 20 U.S. gallons/acre of oil slick surface.

For applications of this formulation at ambient spray temperatures below 10° C. an alkylene glycol such as ethylene glycol or hexylene glycol in useful amounts ranging up 5, preferably 1 to 3, weight percent is incorporated in the formulation, said weight percent based on the total composition.

Representative formulations according to this invention include:

| | Weight Percent | | |
|---|---|---|---|
| Ingredient | Broad | Preferred | Optimal |
| Sorbitan monoester | 5–15 | 7–13 | 10 |
| Polyoxylkylene adduct of sorbitan monoester | 5–15 | 7–13 | 10 |
| Polyoxyalkylene adduct of sorbitan triester | 15–40 | 15–35 | 32 |
| Anionic Surfactant | 3–15 | 5–15 | 7 |
| Viscosity Reducing Agent | 0–15 | 5–10 | 10 |
| Alkylene glycol | 0–5 | 1–3 | 1–3 |
| Isoparaffinic hydro- | 15–40 | 20–35 | 28 |

| | | Weight Percent | |
|---|---|---|---|
| Ingredient | Broad | Preferred | Optimal |
| carbons | | | |
| Water | 0–3 | 1–3 | 1–3 |

In accordance with the teachings of this invention a hydrocarbon based-solvent dispersant formulation is realized by mixing at room temperature with stirring 10.1 grams of sorbitan monooleate, 10.1 grams of sorbitan monooleate ethoxylated with 20 moles of ethylene oxide per mole of monooleate, 31.8 grams of sorbitan trioleate ethoxylated with 20 moles of ethylene oxide per mole of trioleate, 10 grams of ethylene glycol monobutyl ether, 10 grams of the Monowet MT-70 (a 70% solution of the sodium salt of ditridecyl sulfosuccinate in 12% water and 18% hexylene glycol) and 28.0 grams of Isopar M. This formulation has a specific gravity of 0.942 at 15.6° C., a viscosity in centistokes of 118 at 15.6° C. and a pour point below −40° C. Thus for aerial application at an ambient temperature of about 15° to 20° C. the viscosity of the formulation makes it useful without addition of the viscosity reducing agent; however, in a mid-winter application onto an oil slick in colder latitudes the viscosity reducing agent is added in an amount sufficient to obtain a formulation viscosity within the range of 60 to 150 centistokes at ambient temperature whereby the pumping and spraying is facilitated with minimal generation of fine droplets and subsequent drift off target.

The invention in its broader aspect is not limited to the specific details shown and described, and departures may be made from such details without departing from the principles of the invention and without sacrificing its chief advantages.

What is claimed is:

1. A method for dispersing a slick of a heavy oil on water which comprises contacting said oil slick with an effective dispersing amount of a dispersant formulation comprising: 5 to 15 weight percent of a sorbitan monoester of a $C_{10}$–$C_{20}$ aliphatic monocarboxylic acid; 5 to 15 weight percent of a polyoxyalkylene adduct of a sorbitan monoester of a $C_{10}$–$C_{20}$ aliphatic monocarboxylic acid said adduct having 6 to 30 polyoxyalkylene units per mole of monoester; 15 to 40 weight percent of a polyoxyalkylene adduct of a sorbitan triester of a $C_{10}$–$C_{20}$ aliphatic monocarboxylic acid, said adduct having 6 to 30 polyoxyalkylene units per mole of triester; 3 to 15 weight percent of a salt of a dialkyl sulfosuccinate having a critical micelle concentration (at 25° C.) of 0.0005 to 0.005 grams/100 ml; and from 15 to 40 weight percent of an isoparaffinic hydrocarbon solvent having a boiling range of 115° C.–255° C., said weight percent based on the total weight of said composition, wherein said contacting is by means of an aerial spray from an aircraft and said formulation is adjusted to a viscosity of 60 to 150 centistokes measured at 60° F.

2. The method according to claim 1 wherein said sorbitan monoester is sorbitan monooleate, said adduct of a sorbitan monoester is polyethoxylated sorbitan monooleate, said adduct of a sorbitan triester is polyethoxylated sorbitan trioleate, and said salt is sodium ditridecyl sulfosuccinate.

3. The method according to claim 1 wherein said formulation contains an effective amount of ethylene glycol monobutyl ether to adjust said viscosity.

4. A dispersant formulation comprising: 5 to 15 weight percent of a sorbitan monoester of a $C_{10}$–$C_{20}$ aliphatic monocarboxylic acid; 5 to 15 weight percent of a polyoxyalkylene adduct of a sorbitan monoester of a $C_{10}$–$C_{20}$ aliphatic monocarboxylic acid, said adduct having from 6 to 30 polyoxyalkylene units per mole of monoester; 15 to 40 weight percent of a polyoxyalkylene adduct of a sorbitan triester of a $C_{10}$–$C_{20}$ aliphatic monocarboxylic acid, said adduct having from 6 to 30 polyoxyalkylene units per mole of triester; from 3 to 15 weight percent of a salt of a dialkyl sulfosuccinate having a critical micelle concentration (at 250° C.) of 0.0005 to 0.005 grams/100 ml; and from 15 to 40 weight percent of an isoparaffinic hydrocarbon having a boiling range of 115° C.–255° C., said weight percent based on the total weight of said composition, wherein there is also present from 5 to 10 weight percent of viscosity modifier, whereby the formulation has a viscosity of 60 to 200 centistokes at 60° F. and is suitable for controlled aerial spray treatment of a slick of viscous hydrocarbon oil on water.

5. A dispersant formulation according to claim 4 wherein said sorbitan monoester is sorbitan monooleate, said adduct of a sorbitan monoester is polyethoxylated sorbitan monooleate, said adduct of a sorbitan triester is polyethoxylated sorbitan trioleate, and said anionic surfactant is the sodium salt of ditridecyl sulfosuccinate.

6. A dispersant composition according to claim 4 comprising from 15 to 40 weight percent of sorbitan trioleate ethoxylated with 20 moles of ethylene oxide per mole of trioleate from 5 to 15 weight percent of sorbitan monooleate, from 5 to 15 weight percent of sorbitan monooleate ethoxylated with 20 moles of ethylene oxide per mole of monooleate, from 5 to 10 weight percent of hexylene glycol, and up to 3 weight percent water.

7. A dispersant formulation according to claim 6 comprising a mixture of 10 parts of sorbitan monooleate, 10 parts of sorbitan monooleate ethoxylated with 20 moles of ethylene oxide per mole of monooleate, 31 parts of sorbitan trioleate ethoxylated with 20 moles of ethylene oxide per mole of trioleate, 10 parts of ethylene glycol monobutyl ether and 7 parts of the sodium salt of ditridecyl sulfosuccinate, 1 part of water, 2 parts of hexylene glycol and 28.0 parts of an isoparaffinic hydrocarbon having a boiling range of from 207°–255° C., said mixture having a specific gravity of 0.942 at 15.6° C., a viscosity in centistokes of 118 at 15.6° C. and a pour point below −40° C., whereby said mixture is highly suitable for aerial spraying onto an oil slick with minimal drift off target, all of said parts being parts by weight.

* * * * *